Dec. 1, 1970            D. MEYER            3,544,246
INSPIRATOR BURNER
Filed Aug. 26, 1968            2 Sheets-Sheet 1
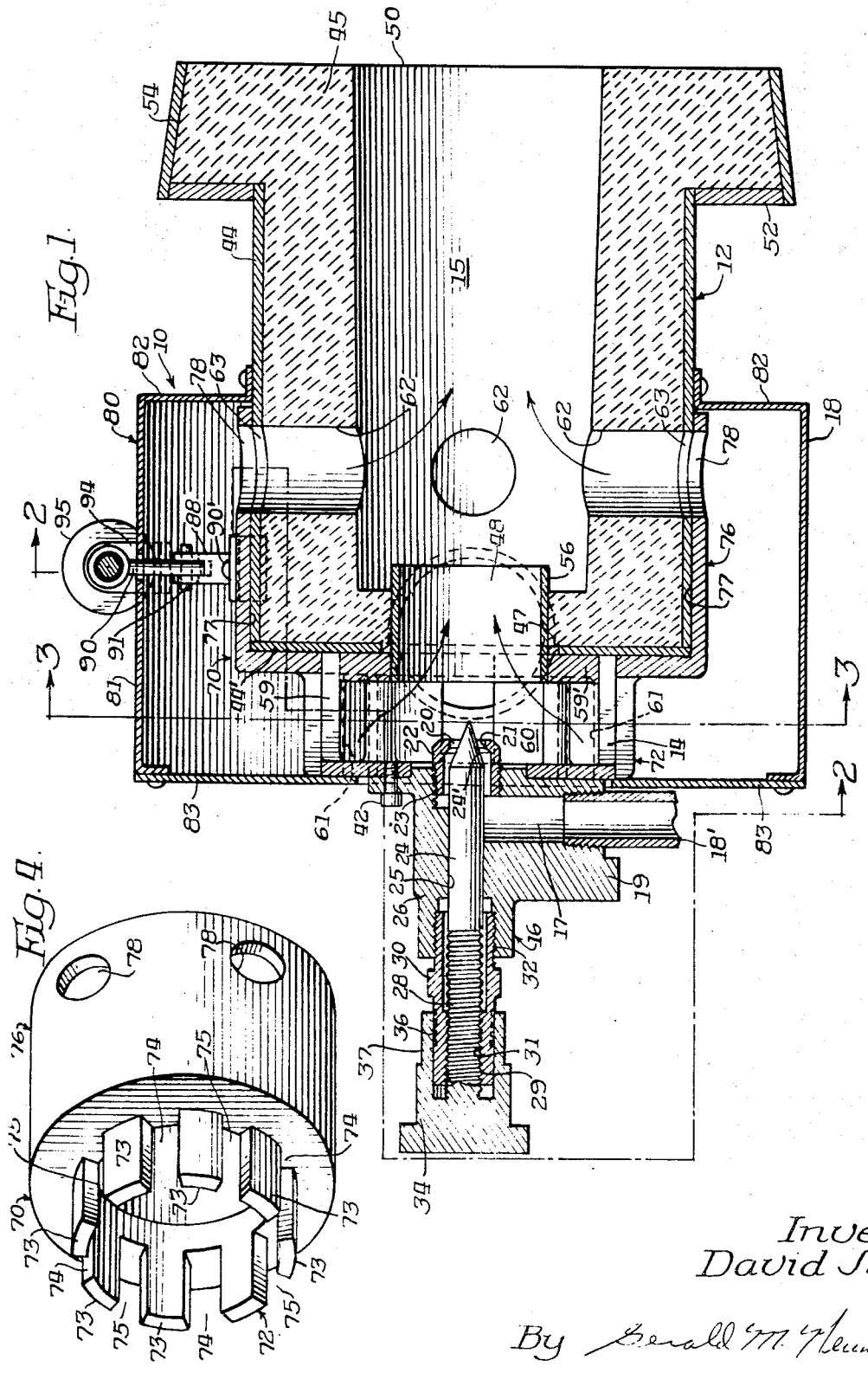
Inventor:
David Meyer
By Gerald M. Neuman Atty

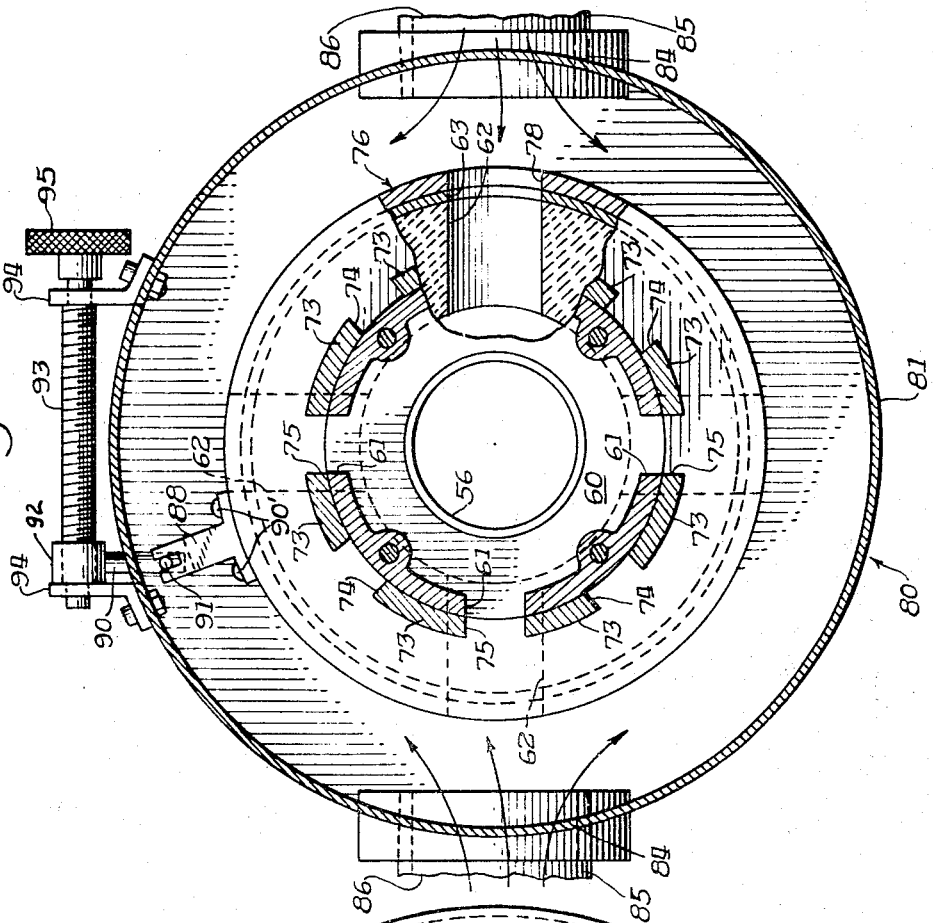
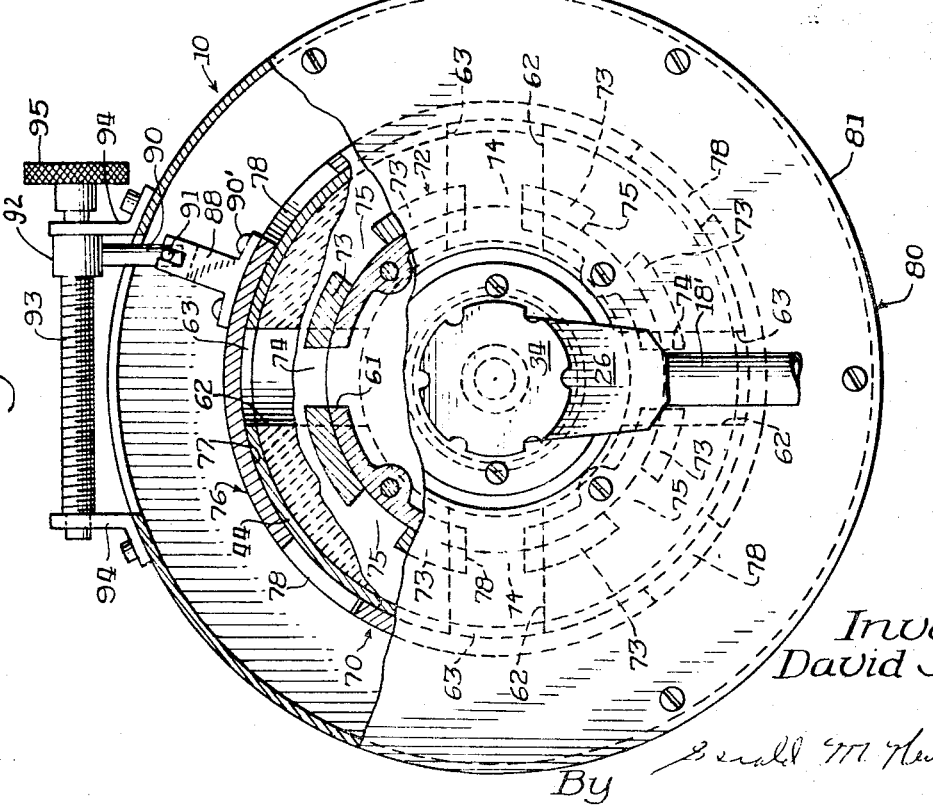

3,544,246
INSPIRATOR BURNER
David Meyer, Kankakee, Ill., assignor to Radiant International Incorporated, a corporation of Illinois
Filed Aug. 26, 1968, Ser. No. 755,109
Int. Cl. F23d 15/02
U.S. Cl. 431—352      6 Claims

ABSTRACT OF THE DISCLOSURE

An inspirator burner having means for preventing the inflow of contaminated air into the combustion chamber environment and also having means for coordinately controlling the quantities of primary and secondary airs entering said chamber.

---

This invention relates in general to gaseous fuel burners having primary utility in industrial applications. In particular, this inventon relates to gaseous fuel burners of the character wherein air at substantially atmospheric pressure is utilized as the combustion supporting medium. More particularly, this invention relates to means for preventing the inflow of contaminated air into the combustion chamber environment and coordinated means for controlling the quantity of air entering said chamber.

Gaseous fuel burners of an industrial nature which use air at atmospheric pressure for supporting combustion are generally referred to as inspirator burners by those familiar with the art. These burners are typically constructed with an open frame between the gas supply regulation means and the combustion chamber, and they draw combustion air from the ambient air immediately surrounding the burner. The environments in which such burners operate in their industrial installations are often severely contaminated with combustion products from adjacent combustion operations which reduces the essential oxygen content of the combustion air and thus reduces burner efficiency and maximum burner temperature capabilities. In addition, the environment often contains uncombustible solid particulate matter which may exude obnoxious odors and possibly air pollutants.

Inspirator burners designed for highly efficient operation, extremely high temperatures, and wherein the total heat output is very large, typically mix the combustion air with the gaseous fuel at two distinct stages of the combustion process. At the first stage a primary source of air at substantially atmospheric pressure is combined with the gaseous fuel to form a combustible mixture adjacent the inlet to the combustion chamber. This mixture is partially combusted slightly downstream of the burner inlet and it is believed that combustion is effected in a series of rapid explosions. At the second stage, additional air which may be referred to as secondary air and which is also at substantially atmospheric pressure, is introduced directly into the combustion chamber for increasing the combustion efficiency by insuring that the gaseous fuel has been completely consumed. Complete consumation of the fuel in a given time period insures maximum B.t.u. output of the inspirator burner and also effectively eliminates the possibility of pollutants which may contaminate the atmosphere or interfere with proper operation of the apparatus intowhich the burner is being fired.

Gas valve means are provided integral with the inspirator burner for regulating the quantity of gaseous fuel delivered to the combustion chamber, thereby regulating the B.t.u. output of the burner for the particular use to which it is put. As the quantity of gas delivered to the combustion chamber is varied, the quantity of air being mixed wih the gas for complete combustion must also be varied. Care must be taken to insure that a sufficient quantity of air is available to mix with the gas and form a highly combustible mixture, but introducing a greater than necessary quantity of air into the combustion chamber must be avoided since this will reduce the burner temperature due to the necessity of elevating the temperature of a surplus, non contributing mass. Adjustment of the quantities of primary and secondary air is quite critical and difficulties may be encountered in regulating the primary and secondary airs simultaneously. It is also desirable to provide means for regulating either only the primary air, or the primary and secondary airs together.

This invention obviates the above mentioned difficulties by providing an enclosure for surrounding the apertures through which primary and secondary air is drawn into the burner thereby completely insolating the burner from contaminated ambient air. Passage means communicate between the enclosure interior and a source of clean, uncontaminated air at atmospheric pressure which is then drawn into the enclosure and subsequently mixed with the gaseous fuel for effecting greater efficiency and higher temperature output of the inspirator burner.

In addition, adjustable damper valve means are provided for regulating the quantity of air mixed with the fuel during two different operational modes. In the first operational mode, only a primary source of air is mixed with the gaseous fuel for combustion in the combustion chamber. In the second mode of operation, primary and secondary airs are mixed with the gaseous fuel for insuring complete and more efficient combustion thereof. For operation in the second mode, means are provided for simultaneously adjusting the primary and secondary air inlets to insure correct proportioning of primary to secondary air for the quantity of gas admitted to the combustion chamber.

Accordingly, the invention provides for enclosure means surrounding the critical structure of an inspirator burner whereat air is admitted to the burner interior, to prevent entrance of contaminated ambient air. Air passages connect the enclosure with a source of clean, uncontaminated air at substantially atmospheric pressure which is utilized for providing combustion support for the gaseous fuel. Air damper valve means of unitary construction and also provided for either simultaneously controlling the air delivered through the primary and secondary air inlet apertures, or for completely restricting the air through the secondary air inlet apertures while allowing full control of the air through the primary air apertures.

Accordingly, the primary object of this invention is to provide an inspirator burner having improved combustion efficiency.

Another object of this invention is to provide means for supplying uncontaminated air at substantially atmospheric pressure for supporting combustion in an inspirator burner.

It is also an object of this invention to provide means for facilitating regulation of the quantities of primary and secondary airs mixed with the gaseous fuel in an inspirator burner.

A further object of this invention is to provide an inspirator burner having adjustment means for controlling the flow thereof of absolute quantities of primary and secondary airs at substantially atmospheric pressure.

It is also an object of this invention to provide regulating means for enabling operation of an inspirator burner in either a first mode wherein quantities of primary and secondary airs are admitted to the combustion chamber, or a second mode wherein only primary air is admitted to the combustion chamber.

Further objects of this invention will become apparent from the reading of the following description in conjunction with the accompanying drawings wherein:

FIG. 1 is an elevational cross-sectional view of an inspirator burner incorporating the invention.

FIG. 2 is a partially cut-away elevational cross-sectional view drawn to the same scale as FIG. 1 and taken along off-set section line 2—2 thereof.

FIG. 3 is an elevational cross-sectional view of the inspirator burner shown in FIG. 1 taken along section line 3—3 thereof.

FIG. 4 is a perspective view of the damper valve of the invention drawn to a reduced scale.

Referring now to FIGS. 1 and 2, an inspirator burner generally referred to by reference numeral 10 is illustrated and includes a combustion tube 12 having a combustion chamber 15, a primary air housing 14, a gas supply assembly 16 for regulating the quantity of gaseous fuel supplied to the combustion chamber and an enclosure 18 for isolating the critical burner structure through which air is drawn into the combustion chamber.

More particularly, supply assembly 16 includes a gas supply pipe 18' for conducting pressurized gaseous fuel from a source, not shown, to a passage 17 defined in a valve housing 19. Passage 17 terminates at an orifice 20 defined by an opening 21 through an adjustable spud 22 which is threadingly received by the valve housing at 23. An adjustable needle valve 24 having a tapered terminus 24' is provided for cooperation with opening 21. The needle valve extends through a horizontal bore 25 provided in the valve housing and is supported therein by an externally threaded portion 28 thereof extending through a bushing 30 which is internally threaded at 31. Bushing 30 is in turn threadingly received at 32 by the valve housing. The left end of the needle valve as seen in FIG. 1 is fixedly secured to an adjustment handle 34 which may be rotated to move the needle longitudinally through the valve housing by cooperation between threads 28 and 31, thereby varying the orifice size and resulting in adjustment of the quantity of gaseous fuel delivered to the combustion chamber. A plurality of circular notches 36 are provided on the exterior surface of bushing 30. By observing the number of notches which are exposed by a skirt 37 of the handle, the relative size of the orifice can be determined.

The combustion tube comprises an outer metal shell 44 which is preferably of cylindrical shape and includes a high temperature resistant refractory lining 45 molded about the interior thereof for more effectively resisting the intense heat generated within the combustion chamber 15. Shell 44 has a rear wall 44' secured thereto by suitable means such as welding. The wall defines an opening 47 forming an inlet 48 to the chamber and it also supports the circular primary air housing 14, to which the valve housing is secured by suitable fasteners 42. An outlet 50 is provided at the opposite end of the combustion tube. Hot combustion products and heat radiation are expended from the outlet into the apparatus being fired. A radially enlarged flange 52 is provided at the outlet end of the combustion chamber and the refractory material is retained therein by a reverse taper 54 formed at the shell portion adjacent the flange.

A combustion ring 56 is positioned at the inlet of the combustion chamber adjacent and coaxial with the gas orifice. The circular primary air housing 14 is also coaxial with the orifice and the combustion ring. The primary air housing is formed of a circular wall 59 and integral planar wall 59' which together form a cavity 60. The circular wall defines a plurality of fixed size apertures 61 (four shown in the preferred embodiment) through which a primary source of air is drawn into the cavity. This primary air is mixed with the gaseous fuel flowing through the orifice, forming a combustible mixture. Combustion is initiated substantially at the combustion ring 56.

A plurality of secondary apertures (four shown in the illustrated embodiment) are cored through the refractory lining at 62 and through the shell at 63. These apertures extend substantially perpendicular to the axis of the burner and communicate between the exterior of the shell and the chamber 15 to supply an additional or secondary source of air at atmospheric pressure to the combustion chamber to insure complete combustion of the gaseous fuel.

As best seen in FIGS. 1, 2 and 4, a damper valve 70 having a circular, collar shape is provided for regulating the quantities of primary and secondary airs entering the combustion chamber. The damper valve has two structural segments which are joined to form a unitary member. The first structural segment 72 is circularly formed with a diameter only slightly larger than the diameter of housing wall 59. This structural segment comprises eight spaced apart fingers 73 forming a total of eight spaced openings 74 and 75. The openings 74 and 75 are evenly spaced about the first structural segment and a series of four openings formed by each reference numeral 74 and 75, each cooperate separately with primary air housing apertures 61 but in no instance do openings forming one series cooperate with apertures 61 at the same time as openings forming the other series. In cooperating with apertures 61, fingers 73 and openings 74 or 75 vary the effective size of apertures 61 to regulate the quantity of primary air supplied to the combustion chamber.

A second structural segment 76 is provided to vary the effective size of secondary apertures 62–63 cored through the refractory lining and shell, respectively. Structural element 76 is also circularly shaped and is formed with an internal diameter 77 of sufficient dimension to allow it to be snugly received by the outer surface of shell 44. A plurality of openings 78 (four shown in the illustrated embodiment) are provided through and circumferentially spaced about the second structural element. These openings correspond in number and relative location about the circumference to the number and circumferential location of the secondary apertures. When openings 78 coincide with the secondary apertures, a maximum supply of secondary air is admitted to the combustion chamber. The collar may be rotatably moved about the burner so that the effective size of the secondary apertures may be varied from fully open, to partially open, to fully closed. While varying the effective size of the secondary apertures, the effective size of the primary air apertures are simultaneously varied. Alternatively, as will be noted below, the primary air apertures may be adjusted while the secondary apertures remain closed.

The two modes of burner operation and the simultaneous adjustment of the effective sizes of the primary and secondary apertures are best understood from a comparison of FIGS. 2 and 3. FIG. 2 shows alternating openings 74 of the first structural element cooperating with primary air apertures 61 in the housing. As illustrated, the primary air apertures have a maximum effective operating area. FIG. 2 further shows the secondary apertures 62–63 to be fully closed since they are covered by the solid portions of structure 76. In this operational mode, the effective size of the primary air apertures may be adjusted through a range between fully open and fully closed, by rotatably moving the damper collar through approximately 22½ degrees counterclockwise around the combustion tube and air housing. During this adjustment, the secondary apertures remain closed.

Referring now to FIG. 3, it may be seen that the damper collar has been rotated approximately 45 degrees counterclockwise from the position shown in FIG. 2. In this new position, alternating series of openings defined by reference numeral 75 are aligned with apertures 61 through the primary air housing. Also, openings 78 through the large diameter second structural element of the damper collar now cooperate with apertures 62–63 through the refractory lining and shell to afford regulation of the quantity of secondary air which may be admitted into the combustion chamber for more complete combustion of the gaseous fuel. While in FIG. 3 the primary and secondary apertures are shown in their fully open position, it will be recognized that the damper collar may be rotated clockwise a maximum of 22½ degrees to afford infinite regulation of the quantities of primary and secondary airs entering the combustion chamber. Also it will be recognized that in the mode of operation wherein both primary and secondary air are supplied to the combustion chamber, due to the unitary construction of the damper valve the air supplies are regulated coordinately thereby facilitating proper regulation with a substantial reduction of effort.

Inlets 74, 75 and 62–63 for the primary and secondary airs, respectively, are exteriorly surrounded by an enclosure 80 having a circumferentially exterior wall 81, a front wall 82 secured to shell 44, and a rear wall 83 secured to wall 81. The rear wall also functions as a damper collar retaining ring to prevent inadvertent removal thereof from the burner tube. Enclosure 80 defines a pair of air inlets 84 provided therethrough which may be connected, by means of a pair of supply conducts 85 forming passages 86, to a source of uncontaminated air remote from the inspirator burner. Supplying the burner with uncontaminated air for supporting combustion of the gaseous fuel eliminates the possibility of utilizing contaminated ambient air which may be partially depleted of combustion supporting oxygen. Ambient air may also contain contaminates of a nature which when burned will produce an obnoxious odor or particulate matter, both of which are generally considered undesirable.

Adjustment means for rotation of the damper collar about the burner tube is provided by means of a radially upstanding arm 88 secured to the damper collar by fastening means 90'. Arm 88 cooperates with a depending arm 90 which is articulately connected thereto at 91. Arm 90 has an internally threaded member 92 at its upper end which is threadingly received over a threaded rod 93. A knurled handle 95 if secured to one end of rod 93 for rotation about its axis on a pair of bearing members 94 which are secured to the enclosure 80. As the threaded rod is rotated, the depending arm traverses along the rod causing rotational movement of the damper collar around the burner tube. Through this adjustment means, accurate adjustment of the damper collar may be made for providing operation of the inspirator burner in either of the two modes described above.

What has been described is an inspirator burner having a novel primary and secondary air control whereby the primary and secondary airs supplied may be coordinately regulated by a unitary damper collar and having enclosure means for preventing combustion of contaminated ambient air in which the inspirator burner may be environed.

I claim:

1. A gaseous fuel burner for heating a furnace or the like comprising: wall means defining a chamber; a source of air at substantially atmospheric pressure; a housing fixed to said chamber and defining a plurality of apertures therethrough and forming a cavity comprising a first air conduit adjacent an inlet opening to said chamber for conducting air from the source to the chamber; said housing and the exterior surface of said chamber each being substantially circular with the chamber having a greater circumference; second air conduit means comprising a plurality of apertures formed through said chamber wall for conducting additional air from the source to the chamber for more complete combustion of the gaseous fuel; a rotatably movable circularly shaped damper comprising a first circular operating member defining a plurality of spaced apart openings cooperating with the housing apertures and a second circular operating member fixed to said first circular operating member defining a plurality of spaced apart openings cooperating with the chamber wall apertures, whereby movement of said damper coordinately closes and opens said air apertures to thereby conjointly regulate the quantity of air conducted to the chamber.

2. The gaseous fuel burner as set forth in claim 1 wherein said openings defined by said first and second circular operating members are circumferentially spaced about their respective members thereby to enable variation of either only the size of said housing apertures or coordinate variation of the size of said housing apertures and said chamber wall apertures.

3. The gaseous fuel burner as set forth in claim 1 wherein said housing defines a given number of evenly spaced apart apertures and said first circular operating member defines two times the number of evenly spaced apart openings as said housing, only one-half of said number of openings defined by said first circular member being cooperable with said housing apertures at any given time, and wherein the openings defined by said second circular member cooperate to vary the size of the apertures through said chamber wall while one-half of the number of said first circular member openings cooperate to vary the size of said housing apertures and substantially seal said chamber wall apertures while the other one-half of said first operating member openings cooperate to vary the size of said housing apertures.

4. The gaseous fuel burner as set forth in claim 2 including additionally: enclosure means substantially enclosing said housing and said chamber wall aperture; and air passage means communicating between said enclosure and a source of uncontaminated air for supplying said uncontaminated air to said chamber.

5. The gaseous fuel burner as set forth in claim 4 wherein said enclosure substantially encloses said damper means, and including additionally: means enabling regulation of said damper means exteriorly of said enclosure.

6. The gaseous fuel burner as set forth in claim 3 further including threaded means secured to said chamber wall and adapted for rotation relative thereto; and means secured to said damper and threadingly received by said threaded means for traversion therealong responsive to rotation of said screw thereby enabling adjustable rotation of said damper about said housing and said chamber wall.

References Cited

UNITED STATES PATENTS

| 1,781,236 | 11/1930 | Lilge | 431—352 |
| 2,284,708 | 6/1942 | Woolley | 431—184 X |
| 2,485,656 | 10/1949 | Raskin | 431—187 X |
| 2,918,117 | 12/1959 | Griffin | 431—188 X |

CARROLL B. DORITY, JR., Primary Examiner

U.S. Cl. X.R.

431—188